US006965873B1

(12) United States Patent
Rhoads

(10) Patent No.: US 6,965,873 B1
(45) Date of Patent: *Nov. 15, 2005

(54) ELECTRONIC COMMERCE USING OPTICAL INPUT DEVICE

(75) Inventor: Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 723 days.

This patent is subject to a terminal disclaimer.

(21) Appl. No.: 09/679,262

(22) Filed: Oct. 4, 2000

Related U.S. Application Data

(63) Continuation-in-part of application No. 09/292,569, filed on Apr. 15, 1999, now abandoned.

(60) Provisional application No. 60/158,015, filed on Oct. 6, 1999, provisional application No. 60/082,228, filed on Apr. 16, 1998.

(51) Int. Cl.[7] .............................................. G06F 17/60
(52) U.S. Cl. ...................... 705/26; 709/217; 709/202; 380/4; 380/28
(58) Field of Search .................. 705/26, 27; 709/217; 709/302; 380/4, 28

(56) References Cited

U.S. PATENT DOCUMENTS

| 4,521,772 A | 6/1985 | Lyon |
| 4,804,949 A | 2/1989 | Faulkerson |
| 5,079,648 A | 1/1992 | Maufe |
| 5,355,146 A | 10/1994 | Chiu et al. |
| 5,448,053 A | 9/1995 | Rhoads |
| 5,484,998 A | 1/1996 | Benjar et al. |
| 5,612,943 A | 3/1997 | Moses et al. |
| 5,613,004 A | 3/1997 | Cooperman et al. |
| 5,621,810 A * | 4/1997 | Suzuki et al. ................ 382/135 |
| 5,635,697 A | 6/1997 | Shellhammer et al. |
| 5,665,951 A * | 9/1997 | Newman et al. ............. 235/375 |
| 5,687,236 A | 11/1997 | Moskowitz et al. |
| 5,721,788 A | 2/1998 | Powell et al. |
| 5,724,522 A * | 3/1998 | Kagami et al. ................ 705/26 |
| 5,734,752 A | 3/1998 | Knox |
| 5,742,522 A | 4/1998 | Yazici et al. |
| 5,765,176 A * | 6/1998 | Bloomberg .................. 715/514 |
| 5,768,426 A | 6/1998 | Rhoads |
| 5,790,703 A | 8/1998 | Wang |
| 5,825,892 A | 10/1998 | Braudaway et al. |
| 5,841,978 A | 11/1998 | Rhoads |
| 5,848,413 A | 12/1998 | Wolff |
| 5,862,260 A | 1/1999 | Rhoads |
| 5,875,249 A | 2/1999 | Mintzer et al. |
| 5,930,377 A | 7/1999 | Powell et al. |
| 5,932,863 A | 8/1999 | Rathus et al. |

(Continued)

FOREIGN PATENT DOCUMENTS

EP  493091  7/1992

(Continued)

OTHER PUBLICATIONS

Kawahara, Tatsuya; Tanaka, Katsuaki; Doshita, Shuji; "Virtual Fitting Room with Spoken Dialogue Interface;" Department of Information Science, Kyoto University (printed in IPSJ Journal vol. 39, No. 05, 1995-1999.*

(Continued)

*Primary Examiner*—Mark Fadok
(74) *Attorney, Agent, or Firm*—Digimarc Corporation

(57) ABSTRACT

Sensing of machine readable indicia associated with a catalog permits on-line ordering of merchandise. A profile of user-specific data (e.g., clothing sizes) can be employed to customize the transaction. Sensing of such indicia on a garment tag permits a collection of complementary clothing or accessories to be presented to a user for review (e.g., by display of a virtual model wearing the garment and some of the clothing/accessories).

5 Claims, 1 Drawing Sheet

U.S. PATENT DOCUMENTS

| | | | |
|---|---|---|---|
| 5,949,055 A | 9/1999 | Fleet et al. | |
| 5,950,173 A * | 9/1999 | Perkowski | 705/27 |
| 6,101,602 A | 8/2000 | Fridrich | |
| 6,108,656 A | 8/2000 | Durst et al. | |
| 6,122,403 A | 9/2000 | Rhoads | |
| 6,131,161 A | 10/2000 | Linnartz | |
| 6,157,330 A | 12/2000 | Bruekers et al. | |
| 6,163,842 A | 12/2000 | Barton | |
| 6,164,534 A | 12/2000 | Rathus et al. | |
| 6,199,048 B1 * | 3/2001 | Hudetz et al. | 705/23 |
| 6,205,249 B1 | 3/2001 | Moskowitz | |
| 6,208,745 B1 | 3/2001 | Florencio et al. | |
| 6,219,634 B1 | 4/2001 | Levine | |
| 6,219,653 B1 * | 4/2001 | O'Neill et al. | 705/26 |
| 6,252,972 B1 | 6/2001 | Linnartz | |
| 6,256,638 B1 | 7/2001 | Dougherty et al. | |
| 6,260,024 B1 * | 7/2001 | Shkedy | 705/26 |
| 6,266,430 B1 | 7/2001 | Rhoads | |
| 6,285,776 B1 | 9/2001 | Rhoads | |
| 6,286,036 B1 * | 9/2001 | Rhoads | 709/217 |
| 6,307,949 B1 | 10/2001 | Rhoads | |
| 6,310,627 B1 * | 10/2001 | Sakaguchi | 345/630 |
| 6,311,214 B1 | 10/2001 | Rhoads | |
| 6,314,457 B1 | 11/2001 | Schena et al. | |
| 6,318,151 B1 | 11/2001 | Wang et al. | |
| 6,320,965 B1 | 11/2001 | Levine | |
| 6,324,573 B1 | 11/2001 | Rhoads | |
| 6,332,194 B1 | 12/2001 | Bloom et al. | |
| 6,377,986 B1 | 4/2002 | Philyaw et al. | |
| 6,408,331 B1 | 6/2002 | Rhoads | |
| 6,438,251 B1 | 8/2002 | Yamaguchi | |
| 6,449,378 B1 * | 9/2002 | Yoshida et al. | 382/100 |
| 6,542,927 B2 | 4/2003 | Rhoads | |
| 6,553,129 B1 | 4/2003 | Rhoads | |
| 6,650,761 B1 | 11/2003 | Rodriguez et al. | |
| 6,681,028 B2 | 1/2004 | Rodriguez et al. | |
| 2001/0002931 A1 | 6/2001 | Maes et al. | |
| 2001/0020270 A1 | 9/2001 | Yeung et al. | |
| 2001/0030769 A1 | 10/2001 | Jacobs | |
| 2001/0033674 A1 | 10/2001 | Chen et al. | |
| 2001/0054150 A1 | 12/2001 | Levy | |
| 2002/0021823 A1 | 2/2002 | Muratani | |
| 2002/0023020 A1 | 2/2002 | Kenyon et al. | |

FOREIGN PATENT DOCUMENTS

| | | | | |
|---|---|---|---|---|
| JP | 6-102797 | * | 6/1994 | G03G 21/00 |
| WO | WO95/14289 | | 5/1995 | |
| WO | WO96/36163 | | 11/1996 | |
| WO | WO97/43736 | | 11/1997 | |

OTHER PUBLICATIONS

Framingham, Watermark building image in network applications market, Networkworld, , vol. 10, Issue 37, p. 63.*

Framingham, OLE-based image mgmt. software cutes time, cost, Networkworld, Feb. 8, 1993, vol. 10, iss. 6, p. 6.*

Alattar, "Smart Images" Using Digimarc's Watermarking Technology, IS&T/SPIE's 12th International Symposium on electronic Imaging, San Jose, CA Jan. 25, 2000, vol. 3971, No. 25.

Boney et al., "Digital Watermarks for Audio Signals", IEEE 1996, pp. 473-480.

Bovik, "Handbook of Image and Video Processing", Academic Press, 2000, pp. 133-136, 154, 155.

Kawahara et al., "Virtual Fitting Room with Spoken Dialog Interface", Department of Information Science, Kyoto University (printed in IPSJ Journal vol. 39, No. 05, 1995-1999.

Puate et al., "Using Fractal Compression Scheme to Embed a Digital Signature Into an Image," *SPIE* vol. 2915, Mar. 1997, pp. 108-118.

* cited by examiner

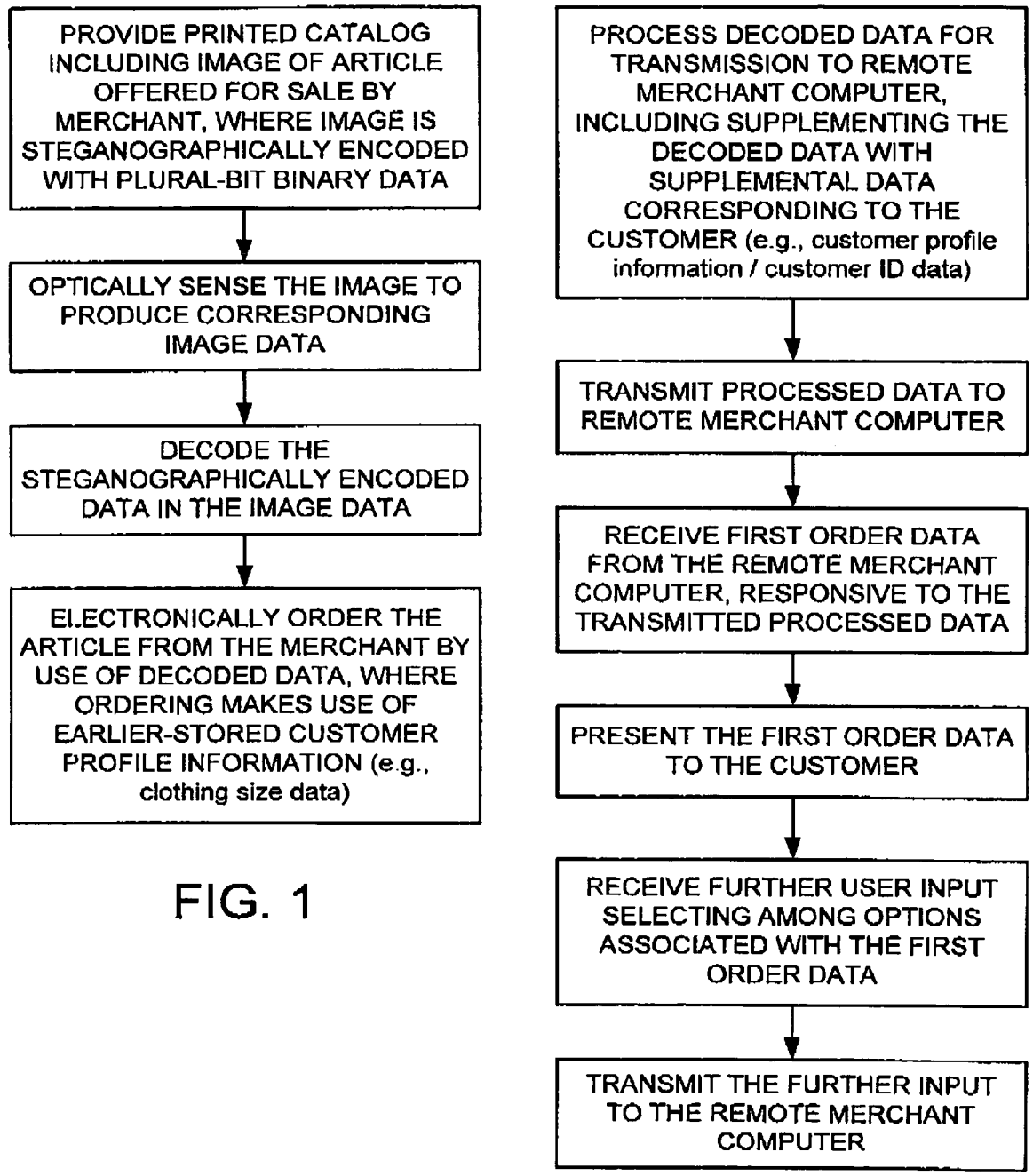

ELECTRONIC COMMERCE USING OPTICAL INPUT DEVICE

RELATED APPLICATION DATA

This application claims priority from provisional application 60/158,015, filed Oct. 6, 1999. This application is also a continuation-in-part of application Ser. No. 09/292,569, filed Apr. 15, 1999 (now abandoned in favor of continuation application Ser. No. 10/379,393), which claims priority from provisional application 60/082,228, filed Apr. 16, 1998.

SUMMARY

In an exemplary embodiment, the following disclosure details an electronic commerce method in which a printed catalog includes an image of an article offered for sale. The image is steganographically encoded with plural-bit binary data. This image is optically sensed to produce image data corresponding thereto. The steganographically encoded data is decoded from the image data and used—in conjunction with earlier-stored customer profile information—to electronically order the article from the merchant.

Other novel features and arrangements will be apparent from the following detailed description, which proceeds with reference to the accompanying drawings.

BRIEF DESCRIPTION OF THE DRAWINGS

FIG. 1 is a flowchart of an illustrative electronic commerce method.

FIG. 2 is a flowchart further elaborating certain of procedures that may be employed in the FIG. 1 process.

DESCRIPTION

The present disclosure memorializes certain improvements to the subject matter detailed in pending application Ser. No. 09/343,104 (Jun. 29, 1999, now abandoned in favor of continuation application Ser. No. 10/764,430), and 09/292,569 (Apr. 15, 1999, now abandoned in favor of continuation application Ser. No. 10/379,393), the disclosures of which are incorporated by reference.

The cited '104 application details a variety of systems in which objects interact with computer devices. The objects can be physical objects, marked with machine-readable indicia, such as digital watermarks. Optical input devices, such as webcams, are used to capture image data from the object, so that the computer device can recognize the object and respond accordingly. One exemplary object is a paper catalog from which merchandise can be ordered.

In the '104 application, the disclosed technology was referred to by the name "Bedoop." The present assignee now markets such technology under the Digimarc MediaBridge name. The former term is used in this disclosure.

One form of optical input device usable in such systems is a mouse-like peripheral that includes an optical sensing system. The optical sensing system can comprise a 1D array of plural optical sensors (e.g., CCD, CMOS, etc.), or a 2D array. Such devices are already known in other contexts, e.g., the Microsoft IntelliMouse with IntelliEye technology. That device includes a multi-element CMOS optical sensor integrated on an IC with various detector and processing circuitry, operating in conjunction with a short focal length imaging lens and an LED illumination source. The circuitry tracks movement of patterns across the sensor's field of view, by which the mouse's movement can be deduced. The Microsoft product collects 1500 data sets per second—a frame rate much higher than is needed in most embodiments of the assignee's Bedoop technology.

Such a mouse-like peripheral can omit the buttons and position-sensing features commonly provided on traditional mice, yielding a simple desk-facing palm camera that generates frames of data corresponding to a small area under the sensor portion of the mouse. More typically, however, the peripheral includes the buttons, roller wheels, and/or X-/Y-position sensing arrangements of traditional mice so that button and positional forms of data input can be exploited in interacting with the Bedoop application.

The optical data collected by the sensor can be processed within the peripheral's processor to extract the steganographically encoded binary Bedoop data therefrom. Or this processing burden can be undertaken by the associated computer system, with the peripheral simply processing and formatting the raw sensor data into sequential frames of image data to be output to that system.

Any form of hand-held scanner—whether of the type just described or others known in the art—offers a convenient way to interact with catalog advertising. Imagine a traditional paper catalog, e.g., from L.L. Bean, Inc., or Lands End. Each image in the catalog is Bedoop-encoded with a code that identifies the depicted product. A user browsing through the catalog, on seeing a product of interest, places the scanner over the picture (and optionally may be required to push a button or otherwise signal to initiate further processing). The scanner detects the Bedoop data and relays it to an associated computer (optionally with data identifying the consumer). The computer polls a remote server computer maintained by the merchant, which responds with data corresponding to the item depicted in the scanned image. This returned data can include data indicating the sizes available, data indicating the colors available, data indicating the variant styles available, flag bits indicating whether each item is in stock, etc. This returned data can be presented to the consumer—typically on a display device but alternatively in audible form.

Preferably, the customer's body measurements (waist size, inseam length, neck size, etc.) are stored in a user profile, either on the local computer or at the merchant's server computer. This allows the system to customize the data presented to the user—e.g., showing the color options and availability only for the depicted shirt in a 16 inch neck and a 34 inch sleeve length.

If necessary, the user can select among the color or style options, using the handheld input device (either buttons, gestures, etc.), or any other input device. Or the item may be one for which no further specifications are needed. In either event, once the desired product has been sufficiently specified, the user can signal the system to place the order. Payment and shipping details can be arranged through any of the great variety of techniques known in the art, e.g., by charging to a credit card number and shipping to an address on-file with the merchant.

FIG. 1 is a flowchart of such an electronic commerce method. FIG. 2 is a flowchart further elaborating certain of the procedures that may be employed in the FIG. 1 process.

Some department stores and clothing retailers offer "personal shoppers" to perform various services. For example, a customer who is purchasing a dress may ask a personal shopper for assistance in selecting shoes or accessories that complement the dress.

A Bedoop-encoded garment tag on the dress can be employed to obtain similar assistance. In response to such a tag, a Bedoop system can query a database to obtain a mini-catalog of clothes and accessories that have previously been identified as complementing the dress identified by the tag. These items can be individually displayed on a screen associated with the system, or a virtual model wearing the dress—together with one or more of the recommended accessories—can be synthesized and depicted. The shopper may quickly review the look achieved by the model wearing the dress with various different pairs of shoes, etc., by repeatedly activating a user interface control (by mouse, touch screen, or garment tag gestures) to cycle through different combinations.

A shopper's credit card can be Bedoop-encoded so as to lead Bedoop systems of particular stores (i.e., stores pre-authorized by the shopper) to a profile on the shopper (e.g., containing size information, repeat purchase information, return history, style/color preferences, etc.).

While scanning peripherals of the type described above are typically wired to an associated host system, wireless links (e.g., radio, infrared, ultrasonic, etc.) can of course be used, freeing the user from the constraint imposed by the cable.

Another use of the technology detailed in the '104 application (and other applications and patents of the present assignee, including U.S. Pat. No. 5,841,886—incorporated herein by reference) is to control building access (or facility access, or room access, etc.) through a combination of an ID card, Bedoop technology, and proximity detection technology.

The ID card can be a badge or the like having a steganographically-encoded photograph of the bearer. The card further includes a proximity ID device, such as an unpowered electronic circuit that is excited and detected by a radiant field from an associated proximity detector, providing a unique signature signal identifying a particular individual.

The building can be provided with an image sensor (such as a video camera or the like), an associated Bedoop detection system, and the proximity detector. When a user wearing the badge approaches, the proximity detector signals the camera to capture image data. The Bedoop detection system identifies the badge photograph (e.g., by clues as are described in the prior applications, or without such aids), captures optical data, and decodes same to extract the steganographically-embedded data hidden therein. The access control system then checks whether the badge ID discerned from the proximity sensor properly corresponds to the Bedoop data extracted from the photograph on the badge. If so, access is granted; if not, the data is logged and an alarm is sounded.

By such arrangement, premises security is increased. No longer can proximity-based access badges be altered to substitute the picture of a different individual. If the photo is swapped, the proximity system ID and the embedded photo data will not match, flagging an unauthorized attempted access.

The same principles are applicable in many other contexts—not limited to RF-based proximity detection systems. For example, the data decoded from the photograph can be compared against other forms of machine-sensed personal identification associated with the badge. These include, but are not limited to, bar code IDs, mag-stripe ID cards, smart cards, etc. Or the comparison can be with an identification metric not associated with the badge (e.g., retinal scan, voice print, or other biometric data).

Having described an illustrated the principles of our inventions with reference to specific embodiments, it will be recognized that the principles thereof can be implemented in many other, different, forms. Moreover, the particular combinations of elements and features in the above-detailed embodiments are exemplary only; the interchanging and substituting of these teachings with teachings in the incorporated-by-reference applications and patent are also contemplated.

I claim:

1. An electronic commerce method comprising:
   providing a printed catalog that includes an image of an article offered for sale by a merchant, wherein the image is steganographically encoded with plural-bit binary data;
   optically sensing the image to produce image data corresponding thereto;
   decoding the steganographically encoded data from the image data; and
   electronically ordering the article from the merchant by use of said decoded data, wherein said ordering makes use of earlier-stored customer profile information.

2. The method of claim 1 in which the customer profile information includes clothing size data.

3. The method of claim 2, further comprising:
   processing the decoded data for transmission to a remote merchant computer, said processing including supplementing the decoded data with supplemental data corresponding to the customer;
   transmitting the processed data to the remote merchant computer;
   receiving first order data from the remote merchant computer, responsive to the transmitted processed data;
   presenting the first order data to the customer;
   receiving from the user further input selecting among options included in the first order data; and
   transmitting said further input to the remote merchant computer.

4. The method of claim 3 in which the supplemental data includes the customer profile information.

5. The method of claim 3 in which the supplemental data includes data identifying the customer.

* * * * *